Dec. 7, 1943. F. S. CARVER 2,336,346
CHOCOLATE PROCESS
Filed Aug. 17, 1940
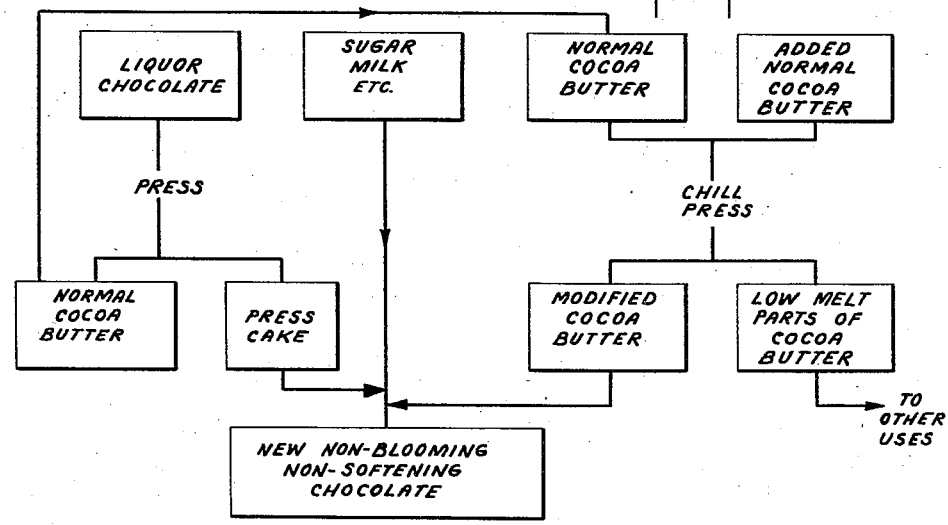
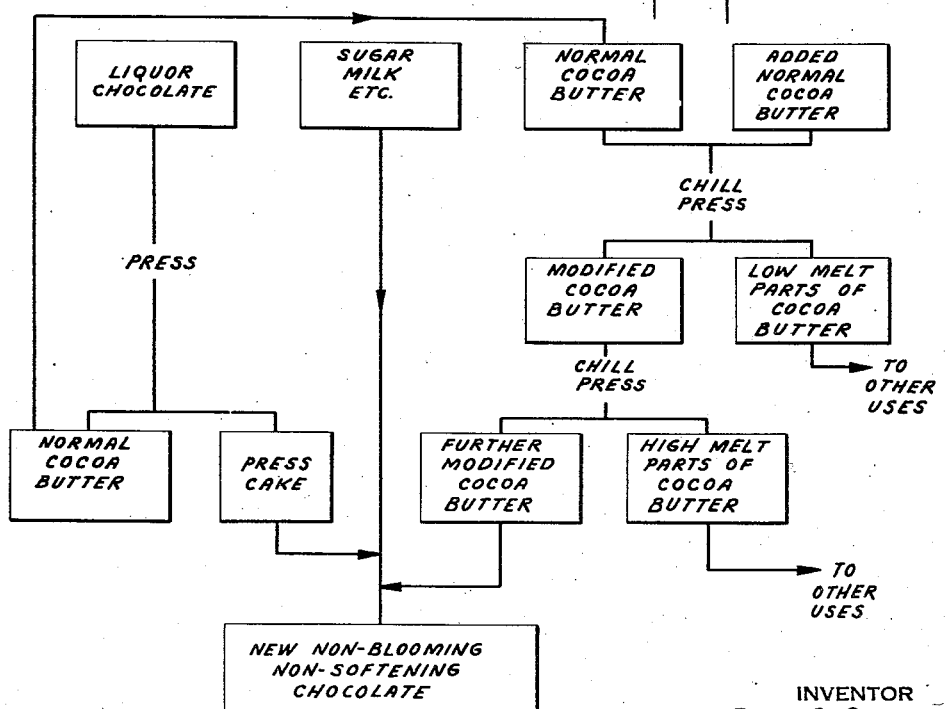
INVENTOR
FRED S. CARVER
BY Dyke + Schaines
ATTORNEYS Patented Dec. 7, 1943

2,336,346

UNITED STATES PATENT OFFICE 2,336,346

CHOCOLATE PROCESS

Fred S. Carver, Short Hills, N. J.

Application August 17, 1940, Serial No. 353,014

8 Claims. (Cl. 99—23)

My invention has for its principal objects the provision of an improved chocolate which is substantially free from surface discoloration known as blooming or graying and does not soften as readily as ordinary chocolate throughout the hot summer months as well as the rest of the year, and the process of making such improved chocolate.

The chocolate of commerce, including sweet chocolate, milk chocolate, bitter chocolate, etc., has heretofore been made by combining milk, sugar, etc., in varying percentages with liquor chocolate (known also as chocolate mass), and added cocoa butter. Liquor chocolate is the material which is produced by grinding the nibs or kernels of roasted cocoa beans that are separated from the shells, and contains on the average about 54% of cocoa butter and 46% solids. The cocoa butter is produced by pressing it from liquor chocolate.

The mixture thus produced has been ground or ground and conched, becoming smooth and homogeneous, and suitable when melted for dipping of chocolate candies or for other coating purposes, and adapted for making chocolate bars and other chocolate products.

Due to the considerable content of cocoa butter in such commercial chocolate, which is partly cocoa butter contained in the liquor chocolate constituting the base material from which the chocolate is made and partly the cocoa butter added thereto in making up the chocolate, the average melting point of the chocolate is approximately the same as the melting point of cocoa butter, namely, approximately 93° F., but softening will begin at considerably lower temperatures, for instance 80° F.

At temperatures materially below approximately 80° F., the chocolate produced from principally liquor chocolate and cocoa butter as above described is quite firm and has good appearance, break and eating characteristics. However, such chocolate becomes soft, mushy and sticky and altogether unsatisfactory for eating purposes when the temperatures are increased and held for long periods at temperatures such as 80° to 93° F. or higher, and particularly when such chocolate is subjected to added warmth as by being held in the hand. This softening arises from the fact that while the cocoa butter content of such chocolate has an average melting point as stated of approximately 93° F., the cocoa butter is made up of a number of different fractions in varying percentages and having individual melting points varying practically all the way from approximately 60° F. up to 140° F. or thereabouts.

When such chocolate of commerce is cooled after being softened by exposure to such elevated temperatures, it exhibits surface discoloration known as "blooming" or "graying." The phenomenon of blooming or graying appears to be due to increased tendency of the low-melt point portions of the cocoa butter content to melt when the chocolate is subjected to elevated temperature, with the result of particles of constituents of the cocoa butter coming to the surface of the softened chocolate, and such particles being left in the form of minute relatively light-colored specks on the surface of the chocolate after the same has been restored to firmness upon being cooled from its heated and softened state.

As a result of the difficulties above referred to, the business in chocolate products is handicapped in many ways. It is relatively slow in the summer, use of chocolate candies and bar chocolate being confined mostly to the cooler months of the year, and practically entirely to non-tropical regions. Subjection to undue heat has to be avoided in the shipping and handling of such products; burdensome allowances must be made for spoilage, etc., etc.

By the present invention a new chocolate is produced in which the tendency to gray or bloom as above described is eliminated or greatly reduced as compared with chocolate as hitherto made, and which does not soften as readily, but which will nevertheless retain the desirable and well known characteristics of chocolate as heretofore made.

In one embodiment, my new process by which my new chocolate is made comprises essentially the steps of pressing the principal part of the cocoa butter out of liquor chocolate so as to leave a solid residue with a low content of cocoa butter, and then combining this solid residue with modified cocoa butter consisting of cocoa butter freed from a large part of the low-melt portions thereof.

One step of my new process is to subject the whole of the liquor chocolate, which is to be used in making my new chocolate, to a pressing operation for removing most of its content of cocoa butter. The pressing operation is so performed as to reduce the content of cocoa butter which remains in the press cake to such a point that the low-melt content of residual cocoa butter in the cake will not be a material factor to produce blooming and softening of my new chocolate made from the press cake so produced, together with other materials. The pressing just referred to can be carried out to advantage by means of filter hydraulic presses, such as described in my Patents Nos. 1,607,722 and 2,072,942. The pressing can be so performed, for example, that the percentage of cocoa butter remaining in the press cake will be approximately 30%, or lower, as 20%, of the total weight of the cake, or otherwise expressed, approximately 64 to 79% of the cocoa butter content of the liquor chocolate is removed. The pressing out of cocoa butter can readily be accomplished with use of heat and pressure, as for example, with apparatus such as referred to, by a pressure of approximately 6000 lbs. per sq. in., and a temperature of approximately 200° F. applied for approximately 20 minutes or less. The cake material produced in this or equivalent ways is used in making my new chocolate.

With such considerable reduction of cocoa butter in the cake after application of heat and pressure, the residual small percentage of cocoa butter in the cake is so intimately associated or tied up with the solids thereof that the low-melt content of such residual cocoa butter in the cake will have little if any tendency to separate or permit constituent particles to come out in the form of surface bloom when chocolate containing such cake material and made by my new process is later subjected to extremely high atmospheric temperatures.

Having the solid material with low cocoa butter content so obtained, I also provide a modified cocoa butter which I combine therewith. The cocoa butter to be modified may be that which was pressed from the liquor chocolate by the pressing above referred to, or other cocoa butter may be used. The modification of the cocoa butter for this purpose is in substance a matter of subtraction by fractionation, without material change in the nature, taste and other qualities of the part retained and used. It consists primarily in removing or reducing the low-melt content of the cocoa butter to a sufficient extent to avoid or at least greatly reduce blooming of my new chocolate which is made in part therefrom.

To produce a modification of the cocoa butter consisting in the reduction of the percentage of low-melt fraction, the cocoa butter after being wholly melted is slowly cooled, as for example cooled to approximately 80° F., or somewhat lower, which may be done for example in large vessels by cooling for about 12-24 hours without agitation, or at lower temperature for about 6-12 hours with agitation. This cooled material is of grainy nature or a coarse slurry containing portions which are crystallized and other portions which are softer or substantially liquid and crystallized only in part if at all.

Upon subjection of the chilled material to moderate pressure, as for example about 600-800 lbs. per sq. in., which may be done with my patented filter hydraulic presses above referred to, or with other presses such as presses in which the material to be pressed is wrapped in filter cloths, a portion of the cocoa butter will be pressed out, consisting principally of constituent fat of the lower melting points, and leaving as a cake the cocoa butter largely freed from the constituents of the lower melting points. This cake material is the modified cocoa butter which is used for making my new chocolate, together with the cake material above described as made from liquor chocolate by removal therefrom in large part of its original content of cocoa butter.

Cocoa butter having an average melting point of about 93° F. ordinarily contains about 40-50% of constituents having individual melting points under 93° F. and about 60-50% above. To obtain good results it has been found best to remove approximately 40-50% of the butter by graining and pressing as above described in order to remove sufficient of the low-melt fraction to obtain a modified cocoa butter suitable for use with my invention.

The low-melting fraction removed in this or other ways is adapted for various uses other than the production of chocolate according to the present invention, as for example for cosmetic creams, coatings for refrigerated edibles, etc., etc.

According to a second embodiment of the invention, a high melting portion of the cocoa butter is separately removed so as to avoid too high melting point in my new chocolate and secure improved digestibility of all component parts. With this embodiment, the cake material produced as last above described and from which low-melting constituents have been removed, can be melted, chilled and pressed in a manner generally similar to that just described. In this case, however, the part used in making my new chocolate is that which is pressed out, and the remaining cake, consisting principally of the highest melting point constituents, is used for other purposes, as for example for lipsticks, cosmetic pencils, and the like.

To produce the chocolate of this invention, the material obtained from liquor chocolate by the freeing thereof from most of its cocoa butter content as first above described is combined with any desired proportion of sugar or sugar and milk, etc., according to the nature of the chocolate product to be produced, and with a suitable proportion of the modified cocoa butter, consisting of normal cocoa butter which has been freed from most of its low-melting point constituents, and which may also be freed from part of its higher-melting point constituents, as above described. The combining of these constituent materials is preferably carried out by a reduction treatment consisting of wet grinding, conching, and the like, so that the natural aromas and flavor characteristics of the chocolate will not be lost.

The chocolate so produced is substantially free from objectionable blooming, and without raising the melting point unduly, makes chocolate and chocolate products an acceptable, stable, all-year-round article of merchandise in temperate climates and also extends the adaptability thereof to sub-tropical and tropical climates. Valuable by-products are also obtained for use in arts outside the field of chocolate.

In the accompanying drawing, Figs. 1 and 2 are flow sheets, Fig. 1 illustrating one mode of carrying out the first of the embodiments of my invention above described, and Fig. 2 illustrating one mode of carrying out the second embodiment of the invention.

I claim:

1. Process of making chocolate which resists softening and is substantially free from blooming in hot weather, which comprises the steps of pressing cocoa butter from liquor chocolate cooling and pressing the cocoa butter to remove a low-melt fraction thereof, and combining the cocoa butter from which the low-melt portion has been removed with the liquor chocolate residue from which cocoa butter has been expressed.

2. Process as in claim 1, in which the liquor chocolate is pressed to such extent that the residue contains less than 30% of normal cocoa butter.

3. Process as in claim 1, in which the liquor chocolate is pressed to such extent that the residue contains less than 20% of normal cocoa butter.

4. Process of making chocolate which resists softening and is substantially free from blooming in hot weather, which process comprises subjecting liquor chocolate to a pressing treatment such that the residual cake contains under half of the original cocoa butter content, cooling and pressing the cocoa butter to remove a low-melt fraction, then subjecting the cocoa butter to further cooling and pressing to remove a high-melt fraction, and combining the cocoa butter from which the low-melt and high-melt fractions have been removed with the aforesaid cake material low in cocoa butter content.

5. Process as in claim 4, in which the liquor chocolate is pressed to such extent as to leave a cake material which contains less than 30% of normal cocoa butter.

6. Process as in claim 4, in which the liquor chocolate is pressed to such extent as to leave a cake material which contains less than 20% of normal cocoa butter.

7. Process of making chocolate which resists softening and is substantially free from blooming in hot weather, which comprises the steps of pressing cocoa butter from liquor chocolate, chilling and pressing the cocoa butter to remove a low-melt fraction thereof, and wet-grinding together the cocoa butter from which a low-melt portion has been removed, the liquor chocolate residue from which cocoa butter has been expressed, and added material including sugar.

8. Process of making chocolate which resists softening and is substantially free from blooming in hot weather, which process comprises subjecting liquor chocolate to a pressing treatment such that the residual cake contains under half of the original cocoa butter content, chilling and pressing the cocoa butter to remove a low-melt fraction and then subjecting the cocoa butter to a further chilling and pressing to remove a high-melt fraction, and wet-grinding together the cocoa butter from which low-melt and high-melt fractions have been removed, the aforesaid cake material low in cocoa butter content, and added materials including sugar.

FRED S. CARVER.